April 22, 1930.  E. DIETZE  1,755,244
DEVICE FOR MEASURING LEVEL DIFFERENCES
Filed Dec. 20, 1928
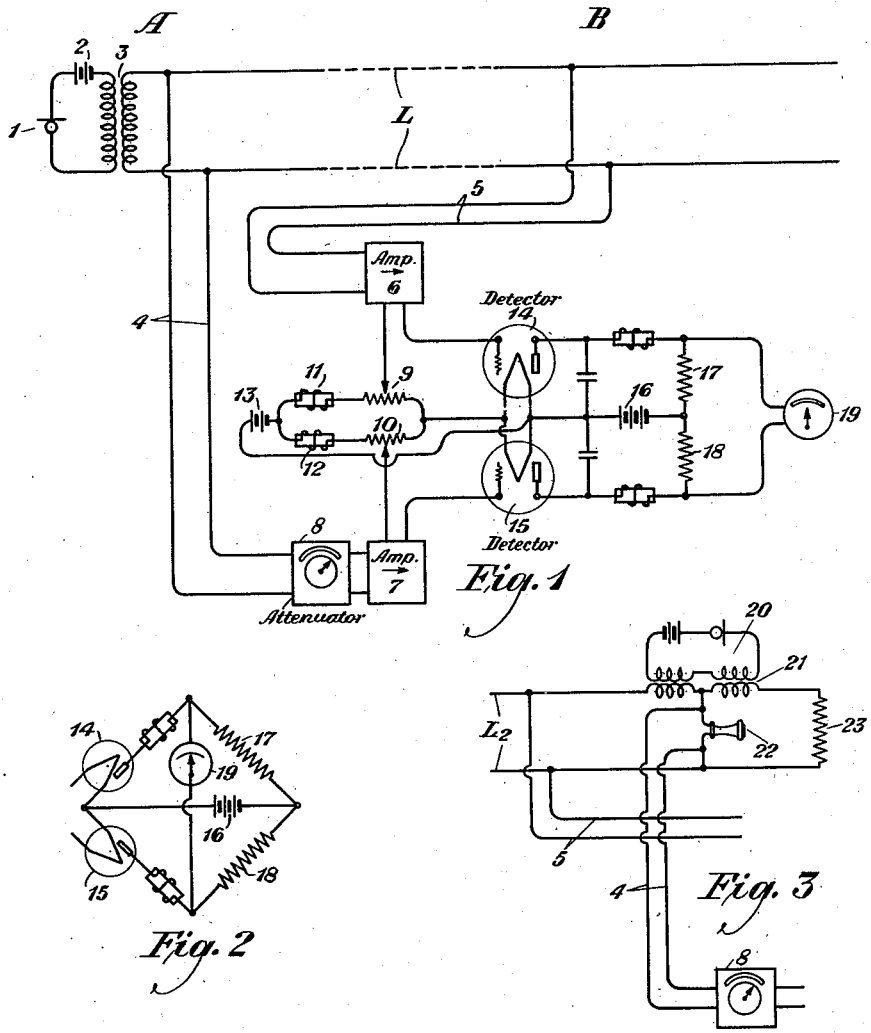
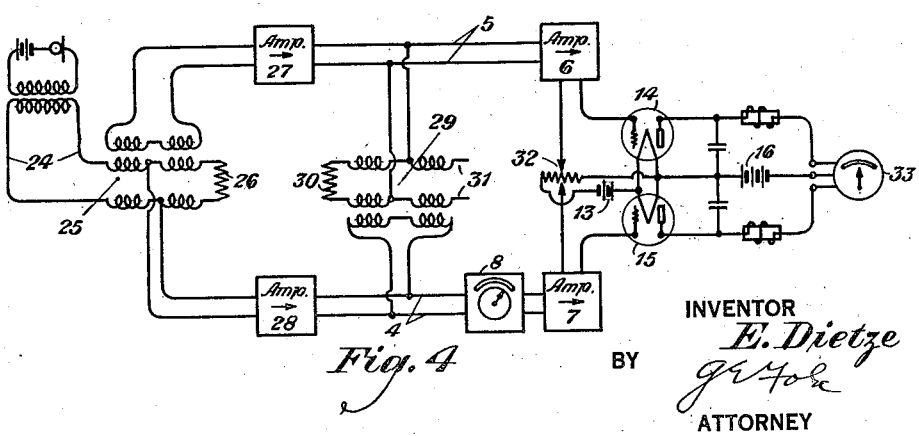
INVENTOR
E. Dietze
BY
ATTORNEY Patented Apr. 22, 1930

1,755,244

UNITED STATES PATENT OFFICE

EGINHARD DIETZE, OF WESTFIELD, NEW JERSEY, ASSIGNOR TO AMERICAN TELEPHONE AND TELEGRAPH COMPANY, A CORPORATION OF NEW YORK

DEVICE FOR MEASURING LEVEL DIFFERENCES

Application filed December 20, 1928. Serial No. 327,441.

This invention relates to arrangements for measuring differences in volume level at different points on transmission circuits.

The arrangements of the invention are particularly applicable to circuits utilized for telephone transmission, although they are also applicable to other types of circuits. Among the uses to which the arrangements of the invention may be put in telephone practice are measurement of line losses, measurement of the side tone balance in telephone set circuits, measurement of the balance in repeater circuits, and other uses.

Heretofore, in determining differences in volume level at different points in a circuit, a device termed a volume indicator has been utilized to measure the volume from a varying source of alternating potential at one point in the circuit. A similar measurement would then be made by the volume indicator at another point on the circuit and the results would be compared. However, it has been found that a determination of the relative levels at the two points with a varying source of alternating potential is often difficult to make with a volume indicator, as the readings taken at the two points will not have the proper relative values, due to variations in the source while the readings are being taken.

The arrangements of the invention obviate the possibility of obtaining false results, as in the method heretofore referred to, by enabling the taking of the difference of the levels at the two points of the circuit directly and by a single operation. The testing arrangements of the invention have further important advantages over other testing methods in that the results obtained are independent of the frequency, the intensity and wave shape of the source. Accordingly, with the arrangements of the invention, tests may be made by merely sending speech over the circuit. This would eliminate the need for single frequency measurements by means of oscillators from which the effect on voice transmission would have to be computed. Furthermore, the results of the measurements of the arrangements of the invention are not affected by phase differences of the voltages compared. Other features and objects of the arrangements of the invention will appear more fully from the detailed description thereof, hereinafter given.

The invention may be more fully understood from the following description, together with the accompanying drawing, in the Figures 1, 2, 3, and 4 of which the invention is illustrated. Fig. 1 is a circuit diagram showing a preferred form of the measuring arrangements as utilized for measuring the difference in volume level between two points on the circuit. Fig. 2 is a schematic showing of the principles of operation of the measuring set. Fig. 3 shows how the arrangements of the invention may be utilized for measuring the side tone balance in telephone set circuits. Fig. 4 illustrates a modified form of measuring set utilized for measuring the balance of a repeater circuit. Similar reference characters have been utilized to denote like parts in all of the figures.

In Fig. 1 is shown a transmission line L. A transmitter 1 in circuit with the battery 2 and a transformer 3 is shown connected to said line for transmitting speech thereover. If it is desired to measure the difference in volume level between two points, such as A and B on the line, connections will be established with said line at such points by the circuits 4 and 5 of the measuring set of the invention. Circuit 5 will lead to the input of a detector tube 14. An amplifier 6 may be included in this circuit to provide greater sensitivity. Circuit 4 will lead to the input of a detector tube 15. Amplifier 7 may be included in this circuit. A device 8, which has been termed an attenuator, will be included in circuit 4. This device is adjustable so that variable amounts of gain or loss may be introduced in circuit 4. The amount of loss or gain introduced by device 8 will be indicated on a scale associated therewith. As devices, such as 8, for introducing variable amounts of gain or loss in a circuit are well known in the art, no further description thereof will be given. The common filament supply for the detector tubes 14 and 15 is provided from the battery 13. In this circuit there will be included the retardation coils 11 and 12 and the variable resistances 9 and 10. In the output circuits of the detector tubes is a common plate battery 16 and the resistances 17 and 18. A galvanometer 19 is also provided. By referring to Fig. 2 it will be seen that the plate impedances (and voltages) of the detector tubes 14 and 15 and the resistances 17 and 18 form the four arms of a Wheatstone bridge. Galvanometer 19 is connected to points of equal potential when the two plate currents are the same. The plate battery 16 is connected across the terminals of the bridge opposite to the ones to which the galvanometer is connected. The voltages applied to the measuring device from points A and B will be detected by the tubes 14 and 15. When the plate currents from these tubes are the same, the galvanometer 19 will show no deflection. The attenuator 8 accordingly should be adjusted to introduce sufficient gain or loss in the circuit 4 so that the galvanometer 19 will show no deflection or, in other words, until the bridge is balanced. The reading of the attenuator will then indicate the difference in volume level between the points A and B.

In Fig. 3 is shown a line $L_2$ connected to a telephone set comprising a transmitter circuit 20 connected by a transformer 21 to the line circuit. Balancing network 23 is illustrated, together with the usual receiver 22. To measure the side tone balance in the telephone set, one of the circuits of the measuring device, such as 5, would be connected to the line $L_2$ and the other circuit, such as 4, would be bridged around the telephone receiver 22. The operation of the arrangements would be substantially the same as with respect to Fig. 1.

In Fig. 4 is shown a modification of the measuring set utilized for measuring the balance of a 22-type repeater. The repeater circuit comprises the two-way circuits 24 and 31, the balancing networks 26 and 30, the hybrid coils 25 and 29, and the amplifiers 27 and 28. The circuits 4 and 5 of the measuring set will be bridged across the opposite one-way paths of the repeater, as shown. The measuring device is substantially similar to that illustrated in Fig. 1 except that the resistances 17 and 18 are eliminated and a special galvanometer 33 is utilized. In this special galvanometer a terminal is brought out from the midpoint of the galvanometer winding and is connected to the plate battery 16. In the filament circuit of the detector tubes a single biasing resistance 32 is provided and the retard coils have been eliminated.

As has been pointed out, the principle employed in the measuring set of the invention has important advantages over other testing methods in that the results obtained are independent of the frequency, the intensity, and wave shape of the source so that tests may be made by merely talking over the circuit, thus eliminating the need for single frequency measurements by means of oscillators from which the effect on voice transmission has to be computed. Furthermore, the results of the measurements are not affected by phase differences of the voltages compared. This is due to the fact that rectification precedes the measure of the level differences in the galvanometer. In addition, the device of the invention has the advantage that it gives a zero reading on the galvanometer when the correct setting of the attenuator has been obtained. Furthermore, before balance is obtained, the direction of the galvanometer deflections indicates definitely in which direction the setting of the attenuator should be altered to effect balance.

While the invention has been disclosed as embodied in certain specific arrangements which are deemed desirable, it is understood that it is capable of embodiment in many and other widely varied forms, without departing from the spirit of the invention as defined in the appended claims.

What is claimed is:

1. A device for measuring differences in volume level, comprising two separate input circuits, means for introducing variable amounts of loss or gain in one of said input circuits, means for introducing a controlled amount of gain in the other of said input circuits, rectifiers in each of said input circuits, a Wheatstone bridge comprising as its arms the output circuits of said detectors and two resistances, a common plate battery for said detector tubes connected across the junction points of opposite arms of said bridge, and a galvanometer connected across the junction points of the other opposite arms of said bridge.

2. A device for measuring differences in volume level, comprising two separate input circuits, means for introducing arbitrary amounts of loss or gain in one of said circuits, means for introducing arbitrary amounts of gain in the other of said circuits, rectifiers in each of said circuits, common filament and common plate supply sources for said rectifiers, and a galvanometer connected across the output circuits of said rectifiers at points of equipotential when the output currents from said rectifiers are equal.

3. In a system for measuring the side-tone balance of a substation network comprising a transmitter, an induction coil, a source of direct current connected with said transmitter and the primary winding of said coil, a transmission circuit having one side connected with one terminal of the secondary winding of said coil, a balancing network having one side connected with the other terminal of the said secondary winding, a telephone receiver connected between the midpoint of said secondary winding and the other side of said transmission circuit and said balancing network, and a side-tone balance measuring set comprising two input circuits, one bridged across said transmission circuit and the other across said telephone receiver, means for introducing a loss or gain connected with one input circuit, means to rectify the current in each input circuit, an output circuit common to both rectifying means, and a current indicating device connected differentially in said output circuit.

In testimony whereof, I have signed my name to this specification this 18th day of December 1928.

EGINHARD DIETZE.